United States Patent
Kim et al.

(10) Patent No.: US 9,588,384 B2
(45) Date of Patent: Mar. 7, 2017

(54) DISPLAY DEVICE AND ELECTRONIC DEVICE HAVING THE SAME

(71) Applicant: SAMSUNG DISPLAY CO., LTD., Yongin, Gyeonggi-Do (KR)

(72) Inventors: Jeung-Soo Kim, Yongin (KR); Jeong-Seok Oh, Yongin (KR); Kwan-Young Han, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 194 days.

(21) Appl. No.: 14/285,795

(22) Filed: May 23, 2014

(65) Prior Publication Data

US 2015/0015805 A1 Jan. 15, 2015

(30) Foreign Application Priority Data

Jul. 11, 2013 (KR) .................. 10-2013-0081486

(51) Int. Cl.
*H05K 7/02* (2006.01)
*H05K 5/00* (2006.01)
*H05K 13/00* (2006.01)
*G02F 1/1345* (2006.01)

(52) U.S. Cl.
CPC ............. *G02F 1/13452* (2013.01); *G02F 2001/13456* (2013.01); *Y10T 29/49117* (2015.01)

(58) Field of Classification Search
None
See application file for complete search history.

(56) References Cited

U.S. PATENT DOCUMENTS

| 6,678,032 B1 * | 1/2004 | Bachus | G02F 1/1333 349/158 |
| 2002/0180686 A1 * | 12/2002 | Yuda | G02F 1/13452 345/103 |
| 2004/0246427 A1 | 12/2004 | Iwanaga et al. | |
| 2008/0308894 A1 * | 12/2008 | Tsai | H05K 1/0268 257/459 |
| 2009/0153790 A1 * | 6/2009 | Tashiro | G02F 1/13452 349/149 |
| 2011/0089576 A1 | 4/2011 | Choi et al. | |
| 2011/0273411 A1 | 11/2011 | Seo et al. | |
| 2012/0050975 A1 * | 3/2012 | Garelli | G06F 1/1615 361/679.27 |
| 2013/0014075 A1 | 1/2013 | Habitz et al. | |
| 2013/0276301 A1 * | 10/2013 | Lai | G02B 6/0068 29/825 |

FOREIGN PATENT DOCUMENTS

| KR | 10-2004-0105585 A | 12/2004 |
| KR | 10-2009-0130507 A | 12/2009 |
| KR | 10-2011-0123527 A | 11/2011 |

* cited by examiner

*Primary Examiner* — Ryan Crockett
(74) *Attorney, Agent, or Firm* — Lee & Morse P.C.

(57) ABSTRACT

A display device includes a display panel, a plurality of driving integrated circuits that provide respective driving signals to the display panel, and an accommodation unit on which the driving integrated circuits are mounted, at least two adjacent driving integrated circuits of the plurality of driving integrated circuits being arranged on the accommodation unit to define a reverse V-shape with respect to an outermost edge of the accommodation unit.

17 Claims, 2 Drawing Sheets

DISPLAY DEVICE AND ELECTRONIC DEVICE HAVING THE SAME

CROSS-REFERENCE TO RELATED APPLICATION

The present application claims priority under 35 U.S.C. §119 to Korean Patent Application No. 10-2013-0081486, filed on Jul. 11, 2013, in the Korean Intellectual Property Office, and entitled: "Display Device and Electronic Device Having The Same," which is incorporated by reference herein in its entirety.

BACKGROUND

1. Field

Embodiments relate generally to a display device including a display device having an accommodation unit on which driving integrated circuits are mounted, and an electronic device having the same.

2. Description of the Related Art

Generally, a display device includes a display panel that displays images and a plurality of driving integrated circuits that provide respective driving signals to the display panel. The display panel includes a plurality of image pixels, a plurality of data lines that transfer data signals from the driving integrated circuits to the image pixels, and a plurality of gate lines that transfer gate signals from the driving integrated circuits to the image pixels.

SUMMARY

Embodiments are directed to a display device and/or an electronic device having the same. A display device is provided that is capable of supporting various designs by cutting out at least one region of an accommodation unit between driving integrated circuits. An electronic device including the display device is also provided.

A display device may include a display panel, a plurality of driving integrated circuits configured to provide respective driving signals to the display panel, and an accommodation unit on which the driving integrated circuits are mounted in a reverse V-shape. The driving integrated circuits may be mounted on the accommodation unit by a chip-on-glass (COG) process. At least one region of the accommodation unit between the driving integrated circuits may be cut out so that the accommodation unit has a cut-out portion. The region of the accommodation unit may be cut out in a polygon-shape or a circle-shape so that the accommodation unit has a cut-out portion of like shape. The region of the accommodation unit may be cut out in a step-type-shape so that the accommodation unit has a cut-out portion of like shape. The driving integrated circuits may be spaced at equal distances on the accommodation unit. The driving integrated circuits may be spaced at unequal distances on the accommodation unit. The driving integrated circuits may be symmetrically arranged with respect to a vertical bisector of a line corresponding to a long side of the accommodation unit. The driving integrated circuits may be asymmetrically arranged with respect to a vertical bisector of a line corresponding to a long side of the accommodation unit. The region of the accommodation unit may be cut out by a laser cutting or a diamond cutting wheel.

An electronic device may include a display device having a display panel, a plurality of driving integrated circuits that provide respective driving signals to the display panel, and an accommodation unit on which the driving integrated circuits are mounted in a reverse V-shape, and a housing combined with the display device. The electronic device may further include a touch sensor device configured to sense a touch input, the touch sensor device being attached to the display device. At least one region of the accommodation unit between the driving integrated circuits may be cut out. The region of the accommodation unit may be cut out in a polygon-shape or a circle-shape. The region of the accommodation unit may be cut out in a step-type-shape. The driving integrated circuits may be spaced at equal distances on the accommodation unit. The driving integrated circuits may be spaced at unequal distances on the accommodation unit. The driving integrated circuits may be symmetrically arranged with respect to a vertical bisector of a line corresponding to a long side of the accommodation unit. The driving integrated circuits may be asymmetrically arranged with respect to a vertical bisector of a line corresponding to a long side of the accommodation unit. The region of the accommodation unit may be cut out by a laser cutting or a diamond cutting wheel.

A method of manufacturing a display device may include connecting a plurality of driving integrated circuits in electrical communication to a display panel. The driving circuits may be configured to provide respective driving signals to the display panel. The driving integrated circuits may be mounted on an accommodation unit in a reverse V-shape. A portion of the accommodation unit may be cut out between the driving integrated circuits. The mounting may be performed using any suitable technique, for example, a chip-on-glass (COG) process. The cutting out may be performed using any suitable technique, for example, using at least one of a laser and a diamond cutting wheel.

BRIEF DESCRIPTION OF THE DRAWINGS

Features will become apparent to those of ordinary skill in the art by describing in detail exemplary embodiments with reference to the attached drawings in which.

Illustrative embodiments will be more clearly understood from the following detailed description taken in conjunction with the accompanying drawings.

DETAILED DESCRIPTION

Figure 1:
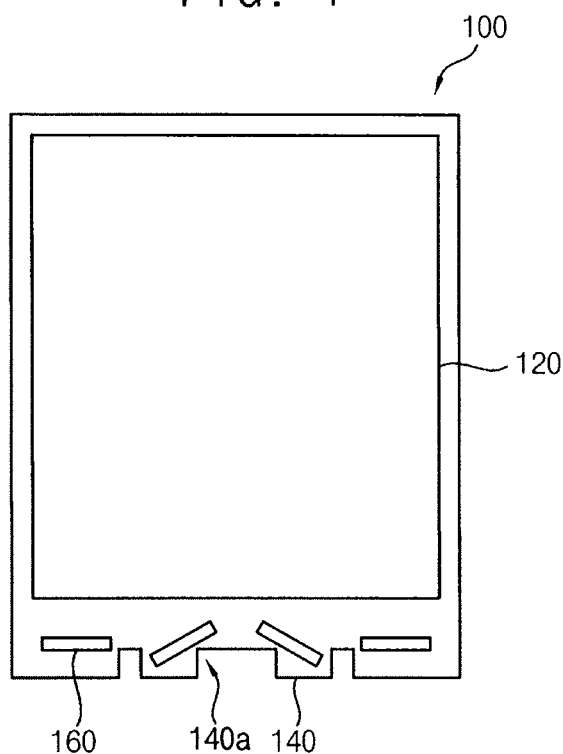
FIG. 1 is a diagram illustrating a display device according to various embodiments.

Example embodiments will now be described more fully hereinafter with reference to the accompanying drawings; however, they may be embodied in different forms and should not be construed as limited to the embodiments set forth herein. Although the terms first, second, third and the like may be used herein to describe various elements, these elements should not be limited by these terms. These terms are used to distinguish one element from another. Thus, a first element discussed below could be termed a second element without departing from the teachings herein. As used herein, the term "and/or" includes any and all combinations of one or more of the associated listed items.

When an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," "on" versus "directly on," and the like).

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components in one or more embodiments, but do not preclude the presence or addition of one or more other features, integers, steps, operations, elements, components, and/or groups thereof in one or more embodiments.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A display device may include a display panel, an accommodation unit, and a plurality of driving integrated circuits. The display panel may display images. For this operation, the display panel may receive driving signals for displaying the images from the driving integrated circuits. For example, the display panel may be a thin-film-transistor liquid-crystal-displays (TFT-LCD) panel, an organic-light-emitting-diodes (OLED) panel, or the like. The driving integrated circuits may be mounted on the accommodation unit by various package processes. For example, the driving integrated circuits may be mounted by a chip-on-glass (COG) process, a tape-carrier-package (TCP) process, a chip-on-flexible-printed-circuit (COF) process, or a chip-on-board (COB) process. The COG process may mount the driving integrated circuits on a glass substrate. The TCP process may use tape-automated-bonding (TAB). The COF process may mount the driving integrated circuits on a polyimide substrate using bumps. The COB process may mount the driving integrated circuits on a printed-circuit-board (PCB) using wire-bonding.

The driving integrated circuits may provide the driving signals for displaying the images to the display panel. The driving integrated circuits may include a source driver block that drives source electrodes of TFT, a gate driver block that drives gate electrodes of the TFT, a graphic random-access-memory (RAM) block that stores a display pattern data, a power generation circuit that supplies power, and the like. Generally, the driving integrated circuits may be spaced at equal distances on the accommodation unit and mounted in parallel with the display panel.

Another display device may include a display panel, an accommodation unit, and a plurality of driving integrated circuits, where the accommodation unit may be cut out. The number of the driving integrated circuits may be decided according to a size or a resolution of the display panel. The display device that supports a high resolution may have a large number of the driving integrated circuits. The driving integrated circuits may be spaced at equal distances and mounted in a straight line on the accommodation unit. As a result, a region of the accommodation unit is such a device may not be used efficiently.

FIG. 1 illustrates a diagram illustrating a display device according to embodiments. Referring to FIG. 1, the display device 100 may include a display panel 120, an accommodation unit 140, and a plurality of driving integrated circuits 160. The display panel 120 may display images. For this operation, the display panel 120 may receive driving signals for displaying the images from the driving integrated circuits 160. The display panel 120 may be a TFT-LCD panel, an OLED panel, or the like. For example, the display panel 120 may be the TFT-LCD panel including a substrate, a backlight, a thin film transistor, a plurality of image pixels, a liquid crystal layer, an alignment film, a common electrode, a polarizer, a color filter, and the like. The display panel 120 may be the OLED panel including a plurality of organic light emitting diodes that have an anode, a cathode, and various organic layers such as an organic light emitting layer, a hole injection layer, an electron transfer layer, and the like between the anode and the cathode.

The driving integrated circuits 160 may provide the driving signals for displaying the images to the display panel 120. The driving integrated circuits 160 may correspond to source driving integrated circuits that drives source electrodes of TFT, gate driving integrated circuits that drives gate electrodes of the TFT, integrated circuits of one-chip solution type which include the source driving integrated circuits and the gate driving integrated circuits, and the like. The driving integrated circuits 160 may be mounted on the accommodation unit 140 in a reverse V-shape. The reverse V-shape indicates a status that the driving integrated circuits 160 are mounted in nonparallel with each other, for example, some of the driving integrated circuit 160 may be positioned at an oblique angle with respect to the display panel 120. The driving integrated circuits 160 are mounted on the accommodation unit 140 in the reverse V-shape such that a region of the accommodation unit 140 may be used efficiently.

The driving integrated circuits 160 may be spaced at equal distances on the accommodation unit 140. The driving integrated circuits 160 may be spaced at unequal distances on the accommodation unit 140. The driving integrated circuits 160 may be symmetrically arranged with respect to a vertical bisector of a line corresponding to a long side of the accommodation unit 140. The driving integrated circuits 160 may be asymmetrically arranged with respect to a vertical bisector of a line corresponding to a long side of the accommodation unit 140.

The driving integrated circuits 160 may be mounted on the accommodation unit 140 by various package processes. The driving integrated circuits 160 may be mounted on the accommodation unit 140 by a COG process. The COG process may mount the driving integrated circuits 160 on a glass substrate using anisotropic-conductivity-films (ACF). The COG process may be useful for small display devices such as a mobile phone, a smart phone, and the like, because the COG process can downsize the display device 100.

At least one region of the accommodation unit 140 between the driving integrated circuits 160 may be cut out. The region 140a of the accommodation unit 140 may be cut out in a polygon-shape (e.g., rectangle) or a circle-shape. At least one function key may be inserted into the region in which the accommodation unit 140 is cut out. Thus, an electronic device can be downsized by arranging the driving integrated circuits 160 according to a design of electronic device and by cutting out at least one region of the accommodation unit 140 between the driving integrated circuits 160. The region of the accommodation unit 140 may be cut out by a laser cutting or a diamond cutting wheel. For example, the region of the accommodation unit 140 may be cut out by instantaneously heating a glass substrate to generate a compressive stress, and by instantaneously cooling the glass substrate to generate a tensile stress (i.e., by the laser cutting). For example, the region of the accommodation unit 140 may be cut out by operating the diamond cutting wheel having tiny diamonds (i.e., by the diamond cutting wheel).

Figure 2:
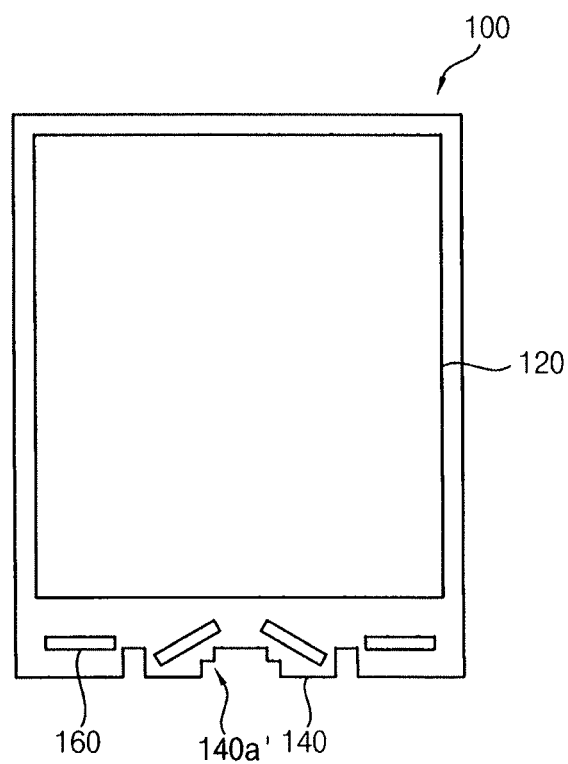
FIG. 2 is a diagram illustrating an example in which a region of an accommodation unit is cut out in a step-type-shape in a display device of FIG. 1.

FIG. 2 illustrates a diagram illustrating an example in which a region of an accommodation unit is cut out in a step-type-shape in the display device of FIG. 1. Referring to FIG. 2, a plurality of driving integrated circuits 160 may be mounted on the accommodation unit 140 in a reverse V-shape. The region 140*a*' of the accommodation unit 140 may be cut out in a step-type-shape. To cut in the step-type-shape is useful for inserting a function key, so that the region of the accommodation unit 140 may be utilized efficiently. The driving integrated circuits 160 may be mounted on the accommodation unit 140 by a COG process. The driving integrated circuits 160 may be spaced at equal distances on the accommodation unit 140. The accommodation unit 140 may be a glass substrate, and cut out by a laser cutting or a diamond cutting wheel. The accommodation unit 140 may be provided as described herein.

Figure 3:
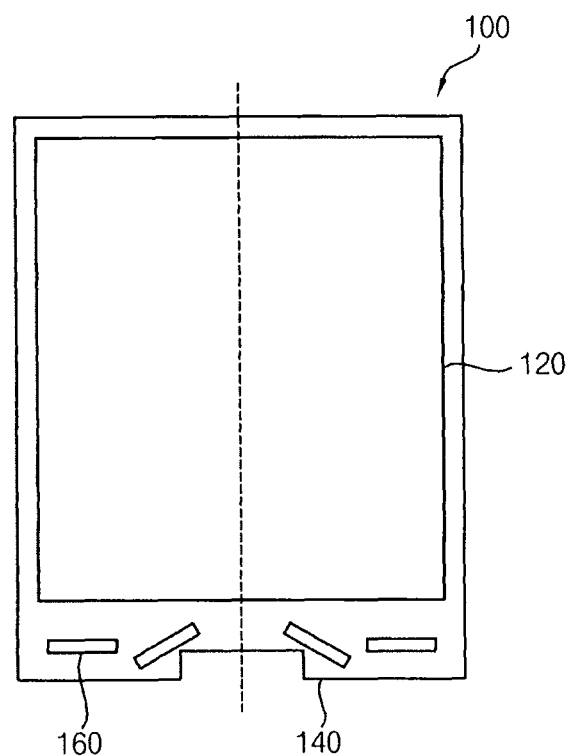
FIG. 3 is a diagram illustrating an example in which driving integrated circuits are spaced at unequal distances on an accommodation unit in a display device of FIG. 1.

FIG. 3 illustrates a diagram illustrating an example in which driving integrated circuits are spaced at unequal distances on the accommodation unit in the display device of FIG. 1. Referring to FIG. 3, a plurality of driving integrated circuits 160 may be spaced at unequal distances along a short side of the accommodation unit 140 for enlarging a region to be cut out in the accommodation unit 140. Generally, the driving integrated circuits 160 may be spaced at equal distances along the short side of the accommodation unit 140 and connected to source lines and gate lines. However, the driving integrated circuits 160 may be spaced at unequal distances on the accommodation unit 140 to increase a space to which a function key is inserted. For example, the driving integrated circuits 160 may be arranged on an edge of the accommodation unit 140, and mounted in a reverse V-shape for enlarging a region to be cut out in the accommodation unit 140. The driving integrated circuits 160 may be symmetrically arranged with respect to a vertical bisector of a line corresponding to a long side of the accommodation unit 140. When the driving integrated circuits 160 are symmetrically arranged with respect to a vertical bisector of a line corresponding to a long side of the accommodation unit 140, a cutting region can be arranged in a center of the accommodation unit 140.

Figure 4:
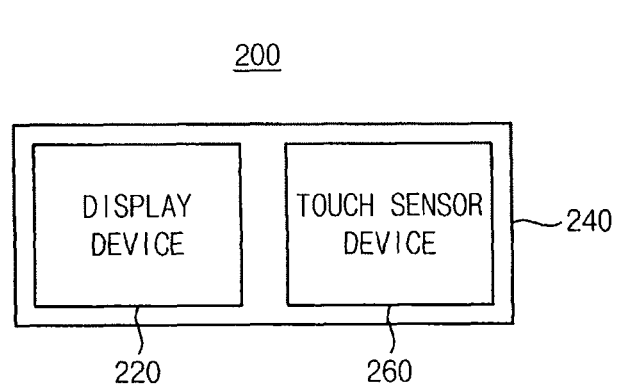
FIG. 4 is a block diagram illustrating an electronic device according to various embodiments.

FIG. 4 illustrates a block diagram illustrating an electronic device according to various embodiments. Referring to FIG. 4, an electronic device 200 may include a display device 220, a housing 240, and a touch sensor device 260. The display device 220 may correspond to one of the display devices of FIGS. 1 through 3. The display device 220 may have an accommodation unit on which driving integrated circuits are mounted in a reverse V-shape. The accommodation unit 140 may be utilized efficiently and the electronic device 200 can support various designs. As described herein, at least one region of the accommodation unit between the driving integrated circuits may be cut out. The region of the accommodation unit may be cut out in a polygon-shape or a circle-shape. The region of the accommodation unit may be cut out in a step-type-shape. In one example embodiment, the driving integrated circuits may be spaced at equal distances on the accommodation unit. The driving integrated circuits may be spaced at unequal distances on the accommodation unit. The driving integrated circuits may be symmetrically arranged with respect to a vertical bisector of a line corresponding to a long side of the accommodation unit. The driving integrated circuits may be asymmetrically arranged with respect to a vertical bisector of a line corresponding to a long side of the accommodation unit. The region of the accommodation unit may be cut out by a laser cutting or a diamond cutting wheel. The display device 220 can be provided as described herein.

The housing 240 may be combined with the display device 220 and the touch sensor device 260. For example, in case of a smart phone, the housing 240 may be a case to cover the display device 220, the touch sensor device 260, a processor, a memory device, a power supply, and the like. The touch sensor device 260 may be attached to the display device 220. The touch sensor device 260 may sense a touch input, and may recognize a touch point. The touch sensor device 260 may include a resistive type sensor that detects a pressure between both electrodes, a capacitive type sensor that detects a change value of capacity on the film, and the like. The electronic device 200 may be one of various electronic devices having the display device 220, for example, a smart phone, a tablet PC, a PDA, and the like. As a result, the electronic device 200 including the display device 220 may have various designs. Furthermore, the electronic device 200 may be manufactured in a small size.

A method of manufacturing a display device may include connecting a plurality of driving integrated circuits in electrical communication to a display panel. The driving circuits may be configured to provide respective driving signals to the display panel. The driving integrated circuits may be mounted on an accommodation unit in a reverse V-shape. The mounting and connecting can be performed in any order. A portion of the accommodation unit may be cut out between the driving integrated circuits. The cutting out may be performed before or after mounting the driving integrated circuits. The mounting may be performed using any suitable technique, for example, a chip-on-glass (COG) process. The cutting out may be performed using any suitable technique, for example, using a laser, a diamond cutting wheel, or both.

The subject matter disclosed herein may be applied to an electronic device having a display device. For example, the subject matter may be applied to a television, a computer monitor, a laptop, a digital camera, a cellular phone, a smart phone, a smart pad, a personal digital assistant (PDA), a portable multimedia player (PMP), a MP3 player, a navigation system, a game console, a video phone, and the like.

By way of summation and review, a display device may make an efficient use of a region of an accommodation unit on which integrated circuits are mounted. Specifically, the driving integrated circuits may be mounted on the accommodation unit in a reverse V-shape, and at least one function key may be inserted into the region in which the accommodation unit is cut out. As a result, the display device may have various designs. In addition, an electronic device including the display device according to example embodiments may have various designs. Furthermore, the electronic device may be manufactured in a small size.

The driving integrated circuit for supporting high resolution display devices has been widely developed. Various methods for downsizing the driving integrated circuit that supports the high resolution display device have been also developed. Manufacturers try to make the best use of a region of an accommodation unit on which a plurality of driving integrated circuits are mounted in order to satisfy customer's needs for design, especially in the field of smartphones. However, in contrast to the exemplary embodiments, it is difficult to satisfy the customer's needs with a display device having an accommodation unit on which a plurality of driving integrated circuits is spaced at equal distances and mounted in a straight line.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A display device, comprising:
   a display panel;
   a plurality of driving integrated circuits to provide respective driving signals to the display panel; and
   an accommodation unit on which the driving integrated circuits are mounted, at least two adjacent driving integrated circuits of the plurality of driving integrated circuits being arranged on the accommodation unit to define a reverse V-shape with respect to an outermost edge of the accommodation unit,
   wherein at least one region of the accommodation unit between the driving integrated circuits includes a cut-out portion, the cut-out portion being between the at least two adjacent driving integrated circuits, and
   wherein the at least two adjacent driving integrated circuits are arranged to have their respective tops adjacent to each other and above the cut-out portion, and their respective bottoms gradually extending away from the cut-out portion.

2. The device as claimed in claim 1, wherein the cut-out portion of the accommodation unit has a polygon-shape or a circle-shape, the at least two adjacent driving integrated circuits partially overlapping respective sides of the cut-out portion.

3. The device as claimed in claim 1, wherein the region of the accommodation unit is cut out in a step-type-shape, the step-type-shape having a first width between tops of the adjacent driving integrated circuits and a second width between bottoms of the adjacent driving integrated circuits, the first width being smaller than the second width.

4. The device as claimed in claim 1, wherein the driving integrated circuits are spaced at unequal distances on the accommodation unit.

5. The device as claimed in claim 1, wherein the at least two adjacent driving integrated circuits are symmetrically arranged with respect to a vertical imaginary line therebetween to define the reverse V-shape.

6. The device as claimed in claim 1, wherein the at least two adjacent driving integrated circuits are inclined in opposite directions with respect to an imaginary vertical line therebetween to define the reverse V-shape.

7. An electronic device, comprising:
   a display device including:
     a display panel,
     a plurality of driving integrated circuits that provide respective driving signals to the display panel, and
     an accommodation unit on which the plurality of driving integrated circuits are mounted, at least two adjacent driving integrated circuits of the plurality of driving integrated circuits being arranged on the accommodation unit to define a reverse V-shape with respect to an outermost edge of the accommodation unit; and
   a housing combined with the display device,
     wherein at least one region of the accommodation unit between the driving integrated circuits includes a cut-out portion, the cut-out portion being between the at least two adjacent driving integrated circuits, and
     wherein the at least two adjacent driving integrated circuits are arranged to have their respective tops adjacent to each other and above the cut-out portion, and their respective bottoms gradually extending away from the cut-out portion.

8. The device as claimed in claim 7, further comprising:
   a touch sensor device to sense a touch input, the touch sensor device being attached to the display device.

9. The device as claimed in claim 7, wherein the cut-out portion of the accommodation unit has a polygon-shape or a circle-shape.

10. The device as claimed in claim 7, wherein the cut-out portion of the accommodation unit has a step-type-shape.

11. The device as claimed in claim 7, wherein the driving integrated circuits are spaced at equal distances on the accommodation unit.

12. The device as claimed in claim 7, wherein the driving integrated circuits are spaced at unequal distances on the accommodation unit.

13. The device as claimed in claim 7, wherein the driving integrated circuits are symmetrically arranged with respect to a vertical bisector of a line corresponding to a long side of the accommodation unit.

14. The device as claimed in claim 7, wherein the driving integrated circuits are asymmetrically arranged with respect to a vertical bisector of a line corresponding to a long side of the accommodation unit.

15. A method of manufacturing a display device, the method comprising:
   connecting a plurality of driving integrated circuits in electrical communication to a display panel, the driving integrated circuits being configured to provide respective driving signals to the display panel;
   mounting the driving integrated circuits on an accommodation unit, such that at least two adjacent driving integrated circuits of the plurality of driving integrated circuits are arranged on the accommodation unit to define a reverse V-shape with respect to an outermost edge of the accommodation unit; and
   cutting out a portion of the accommodation unit between the driving integrated circuits to define a cut-out portion, such that the at least two adjacent driving integrated circuits are arranged to have their respective tops adjacent to each other and above the cut-out portion, and their respective bottoms gradually extending away from the cut-out portion.

16. The method of manufacturing as claimed in claim 15, wherein cutting out the portion of the accommodation unit between the driving integrated circuits includes using at least one of a laser and a diamond cutting wheel.

17. The method of manufacturing as claimed in claim 16, wherein the mounting is performed using a chip-on-glass (COG) process.

\* \* \* \* \*